(12) United States Patent
Kamikawa et al.

(10) Patent No.: US 8,604,156 B2
(45) Date of Patent: Dec. 10, 2013

(54) DEVICE AND METHOD FOR PRODUCING POLYBUTYLENE SUCCINATE

(75) Inventors: Masayuki Kamikawa, Hitachinaka (JP); Toshiaki Matsuo, Mito (JP); Kenichiro Oka, Mito (JP); Takeyuki Kondo, Hitachi (JP); Yasunari Sase, Tokyo (JP); Masashi Tanto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/503,078

(22) PCT Filed: Oct. 21, 2010

(86) PCT No.: PCT/JP2010/068543
§ 371 (c)(1),
(2), (4) Date: Apr. 20, 2012

(87) PCT Pub. No.: WO2011/049152
PCT Pub. Date: Apr. 28, 2011

(65) Prior Publication Data
US 2012/0202962 A1    Aug. 9, 2012

(30) Foreign Application Priority Data
Oct. 21, 2009    (JP) .................................. 2009-242111

(51) Int. Cl.
*C08G 63/02*    (2006.01)
(52) U.S. Cl.
USPC ............................. 528/271; 422/134; 528/272
(58) Field of Classification Search
USPC .................................. 528/271, 272; 422/134
See application file for complete search history.

(56) References Cited

U.S. PATENT DOCUMENTS

| | | |
|---|---|---|
| 6,417,266 B1 | 7/2002 | Terado et al. |
| 6,458,916 B1 | 10/2002 | Yamaguchi et al. |
| 2003/0045671 A1 | 3/2003 | Yamaguchi et al. |
| 2003/0208030 A1 | 11/2003 | Yamaguchi et al. |
| 2004/0166039 A1 | 8/2004 | Yamaguchi et al. |

FOREIGN PATENT DOCUMENTS

| | | |
|---|---|---|
| CN | 1556824 A | 12/2004 |
| JP | 8-27262 | 1/1996 |
| JP | 9-71641 | 3/1997 |
| JP | 2001-81167 | 3/2001 |
| JP | 2003-64171 | 3/2003 |
| JP | 2006-242636 | 9/2006 |

OTHER PUBLICATIONS

CN Office Action of Appln. No. 201080047394.6 dated Mar. 28, 2013.

*Primary Examiner* — Terressa Boykin
(74) *Attorney, Agent, or Firm* — Antonelli, Terry, Stout & Kraus, LLP.

(57) ABSTRACT

A device and a method for producing high-quality polybutylene succinate are provided. The method for producing polybutylene succinate comprises the steps of: preparing a raw-material slurry by mixing succinic acid or a derivative thereof with 1,4-butanediol in a raw-material slurry preparation tank; storing the raw-material slurry in a raw-material slurry storage tank while maintaining flowability; carrying out an esterification reaction of the raw-material slurry in an esterification reactor; and synthesizing polybutylene succinate with a polycondensation reaction of the ester in a polycondensation reactor, in which the polycondensation reactor is divided, from the upstream side, into at least an initial polycondensation reactor, an intermediate polycondensation reactor, and a final polycondensation reactor, a catalyst is added in an amount from 1000 ppm to 3000 ppm in relation to succinic acid or a derivative thereof, the reaction time in the intermediate polycondensation reactor ranges from 0.25 hours to 0.75 hours, and the reaction temperature in the final polycondensation reactor ranges from 245° C. to 255° C.

8 Claims, 4 Drawing Sheets

DEVICE AND METHOD FOR PRODUCING POLYBUTYLENE SUCCINATE

BACKGROUND OF THE INVENTION

The present invention relates to a device and a method for producing polybutylene succinate.

Polybutylene succinate is an aliphatic polyester produced by polycondensation of succinic acid or a derivative thereof with 1,4-butanediol.

A known method for synthesizing polybutylene succinate comprises performing an esterification reaction of succinic acid or a derivative thereof with 1,4-butanediol, and then heating and agitating the thus obtained ester in a high vacuum environment for a transesterification reaction (polycondensation), for example. An esterification reaction is carried out as follows. A carboxyl group of succinic acid or a terminal group of a derivative thereof is caused to undergo an esterification reaction with hydroxyl groups of 1,4-butanediol at a given temperature and pressure, so as to generate an oligomer having hydroxyl groups at its ends. In a polycondensation step, a transesterification reaction is carried out in the presence of a catalyst and vacuum devolatilization of 1,4-butanediol, which is a by-product thereof, is carried out, so as to increase molecular weight and viscosity. Therefore, a process is required that allows the system to be maintained at a high temperature and satisfies vacuum conditions by which the degree of vacuum is increased as the process proceeds is required. At this time, mechanical agitation is carried out to distill off elimination components existing in the surface layer of the reactant, so as to sufficiently increase vaporization surface area for by-products and the rate (surface update rate) of transfer of by-products from within the reaction solution to the vaporization surface.

In a polycondensation step, ester is heated and agitated in a vacuum environment, so that the polymer molecular chain grows due to a transesterification reaction. At this time, 1,4-butanediol as a by-product is removed by devolatilization because of reduced pressure, so that the reaction proceeds. Accordingly, in general, the degree of vacuum gradually increases as the reaction proceeds. In the case of polybutylene succinate, polymer molecules may be subjected to crosslinking in view of increasing polymer elasticity (elastomer formation). Two types of crosslinking method are: a method that involves mixing, in advance, succinic acid with a substance having a molecular size similar to that of succinic acid and having a factor capable of crosslinking, in addition to two carboxyl groups; and a method that involves mixing a coupling agent (e.g., urethane bond formation with the use of isocyanates) that reacts with terminal hydroxyl groups of a plurality of polymers after polymerization.

Examples of such a substance used for the former method include the one a hydroxyl group as a crosslinking factor and undergoing side-chain growth by polycondensation reaction or binding to other polymer molecules (i.e. malic acid), and the one having a double bond between carbon atoms as a crosslinking factor and crosslinking polymer molecules by conducting radical polymerization reaction after completion of polycondensation (i.e. itaconic acid). The use of malic acid is problematic in that molecule cyclization takes place during side-chain growth so that a terminal group serving as a growth point for polymerization reaction is lost, and thus the growth of a polymer molecular chain (that is, molecular weight increase) may be inhibited. Hence, the discovery of polymerization process conditions has been required to avoid this result.

A known method for coping with such a problem is the method disclosed in Patent Document 1 that involves adjusting polycondensation process conditions. According to the method disclosed in Patent Document 1, a polymer having a target molecular weight can be efficiently produced. However, the conditions disclosed in Patent Document 1 are problematic in that it is difficult to vary polycondensation process conditions depending on the progress of the reaction, and thus molecule cyclization may take place and a molecular weight increase may halt.

Meanwhile, a known method by which polycondensation process conditions can be varied depending on the progress of the reaction is a method for producing polybutyrene terephthalate, which is disclosed in Patent Document 2. According to the method disclosed in Patent Document 2, polycondensation process conditions can be varied depending on reaction progress. However, polycondensation of polybutyrene terephthalate does not cause molecular weight increase to be inhibited. Hence, a desired molecular weight may not be obtained if the process conditions are applied to the polycondensation of polybutylene succinate.

Patent Document 1: JP Patent No. 2713108
Patent Document 2: JP Patent No. 3847765

SUMMARY OF THE INVENTION

The present invention is achieved in view of the above problems. An object of the present invention is to produce high-quality polybutylene succinate through optimization of polymerization process conditions for polycondensation steps in the polybutylene succinate production process.

To achieve the above object, the present inventors have found a novel device and a novel method for producing polybutylene succinate that are optimal for increasing molecular weight, which comprise synthesizing polymers under various conditions in polycondensation steps. Specifically, the present invention encompasses the following (1) to (6).

(1) A method for producing polybutylene succinate, comprising the steps of:
  preparing a raw-material slurry by mixing succinic acid or a derivative thereof with 1,4-butanediol in a raw-material slurry preparation tank;
  storing the raw-material slurry in a raw-material slurry storage tank while maintaining flowability;
  carrying out an esterification reaction of the raw-material slurry in an esterification reactor; and
  synthesizing polybutylene succinate through a polycondensation reaction of the ester in a polycondensation reactor; wherein
    the polycondensation reactor is divided into, from the upstream side, at least an initial polycondensation reactor, an intermediate polycondensation reactor, and a final polycondensation reactor;
    a catalyst is added in an amount from 1000 ppm to 3000 ppm in relation to succinic acid or a derivative thereof;
    the reaction time in the intermediate polycondensation reactor ranges from 0.25 hours to 0.75 hours; and
    the reaction temperature in the final polycondensation reactor ranges from 245° C. to 255° C.

(2) The method for producing polybutylene succinate according to (1), wherein the reaction time in the intermediate polycondensation reactor ranges from 235° C. to 245° C.

(3) The method for producing polybutylene succinate according to (1) or (2), wherein the reaction temperature in the final polycondensation reactor is higher than the reaction temperature in the intermediate polycondensation reactor by 5° C. to 15° C.

(4) A device for producing polybutylene succinate, comprising:
   a raw-material slurry preparation tank for preparing a raw-material slurry by mixing succinic acid or a derivative thereof with 1,4-butanediol;
   a raw-material slurry storage tank for storing the prepared raw-material slurry while maintaining flowability;
   an esterification reactor for an esterification reaction of the raw-material slurry; and
   a polycondensation reactor for synthesizing polybutylene succinate through a polycondensation reaction of the ester; wherein
   the polycondensation reactor is divided into, from the upstream side, at least an initial polycondensation reactor, an intermediate polycondensation reactor, and a final polycondensation reactor;
   the device has a catalyst adding apparatus for adding a catalyst in an amount from 1000 ppm to 3000 ppm in relation to succinic acid or a derivative thereof;
   the reaction time in the intermediate polycondensation reactor is set from 0.25 hours to 0.75 hours, and the reaction temperature in the final polycondensation reactor is set from 245° C. to 255° C.
(5) The device for producing polybutylene succinate according to (4), wherein the reaction temperature in the intermediate polycondensation reactor is set from 235° C. to 245° C.
(6) The device for producing polybutylene succinate according to (4) or (5), wherein the reaction temperature in the final polycondensation reactor is set to be higher than the reaction temperature in the intermediate polycondensation reactor by 5° C. to 15° C.

EFFECTS OF THE INVENTION

According to the device and the method for producing polybutylene succinate of the present invention, the molecular weight of polybutylene succinate that is caused to conduct a condensation reaction in the production process can be increased to an arbitrary molecular weight, and thus high-quality polybutylene succinate can be produced.

Figure 1:
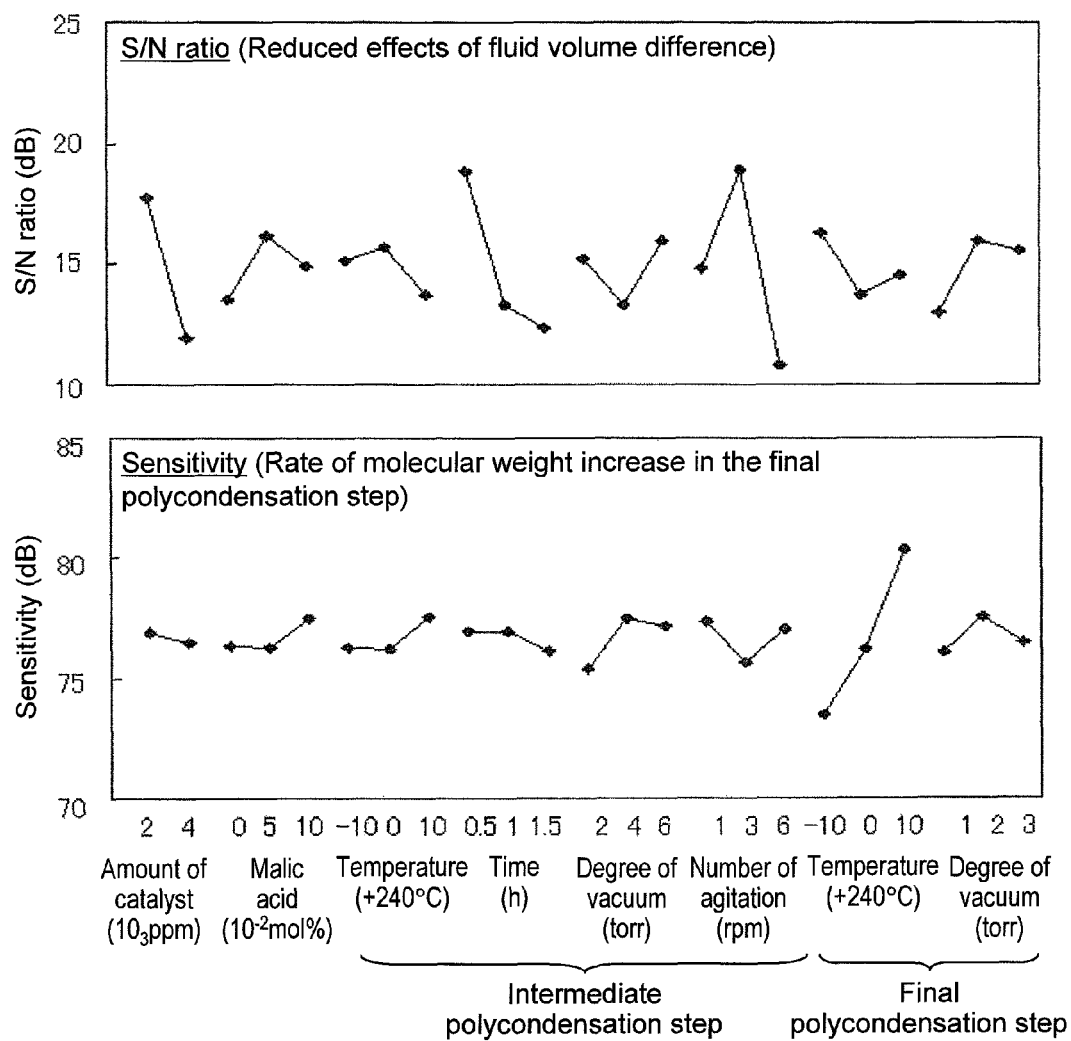
FIG. 1 shows factor effect graphs concerning S/N ratio and sensitivity, which were obtained by data analysis by Taguchi methods.

This description includes part or all of the contents as disclosed in the description, claims, and/or drawings of Japanese Patent Application No. 2009-242111, which is a priority document of the present application.

DETAILED DESCRIPTION OF THE INVENTION

In the present invention, the correlation between the theory of a polymerization reaction and the applicable conditions of Taguchi methods was examined, so that signal factor Y and output $M_K$ were selected. Subsequently, control factors, an error factor, and each level of the factors were selected. Regarding Taguchi methods, the methods disclosed in Reference 1 are known and thus were used herein (Reference 1: Genichi Taguchi, Quality Engineering at Development and/or Design Stage, Japanese Standards Association, JSA, p 73 (1988)).

As regards the signal factor Y and output $M_k$ in the Taguchi methods, input factor and output should have a proportional relation represented by a line that passes through the origin. An transesterification reaction that governs polymer chain growth is represented by the following chemical formula,

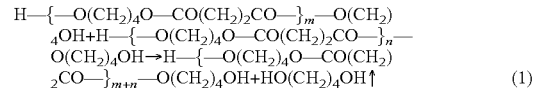

This is described as follows based on the concentration [OH] of a terminal hydroxy group associated with generation·devolatilization of 1,4-butanediol.

Therefore, the above reaction can be regarded as a reaction whereby two hydroxy groups act under reaction rate constant k so that two hydroxy groups disappear. When the temperature is constant, the reaction governing equation (rate equation) is as follows.

The following analytical solution is obtained by the above time-integration equation.

Meanwhile, the correlation between the concentration of the terminal group and the average degree of polymerization $P_w$ during time "t" (between the initial state and time "t" for the progress of polymerization) is as follows.

In the above equation, the initial state $[OH]_{t=0}$ (before polymerization) depends on the raw material composition ratio $(BDO/SA)(=(1+P_w(0))/P_w(0))$ in an esterification step and the concentration of terminal hydroxy group $[OH]_{init}$ in the raw-material mixture, as in the following equation.

The weight-average degree of polymerization $P_w$ and the weight-average molecular weight $M_w$ have the following correlation.

With the above equation, the following equation is obtained as the correlation between the molecular weight and the polymerization time.

Based on the result, as represented by the following equation, the final polycondensation time (the reaction time in the final polycondensation reactor) and the resulting molecular weight increment were selected as a signal factor and an output, respectively, under constant temperature conditions. Thus, the results of a polybutylene succinate polymerization process experiment can be applied to data analysis by Taguchi methods (Table 1).

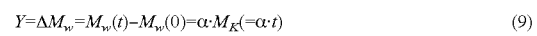

TABLE 1

| Signal factor | Level 1 | Level 2 | Level 3 |
|---|---|---|---|
| Time for final polycondensation (h) | 0 | 1 | 2 |

Next, control factors and the levels thereof were selected (Table 2).

TABLE 2

| No | Control factor | Level 1 | Level 2 | Level 3 |
|---|---|---|---|---|
| A | Amount of catalyst added (ppm) | 2000 | 4000 | — |
| B | Concentration of modifier (mol % with respect to succinic acid) | 0 | 0.05 | 0.1 |
| C | Temperature in intermediate polycondensation (° C.) | 230 | 240 | 250 |
| D | Time for intermediate polycondensation (h) | 0.5 | 1 | 1.5 |
| E | Degree of vacuum for intermediate polycondensation (torr) | 2 | 4 | 6 |
| F | Agitation rate for intermediate polycondensation (rpm) | 1 | 3 | 6 |
| G | Temperature in final polycondensation (° C.) | 230 | 240 | 250 |
| H | Agitation rate for final polycondensation (rpm) | 1 | 2 | 3 |

Control factor candidates include, in addition to raw-material composition ratio, the amount of a modifier (malic acid) added, and the amount of a catalyst added after completion of esterification, and temperature, time, pressure, and agitation rate for an esterification reaction, an initial polycondensation reaction, an intermediate polycondensation reaction, and a final polycondensation reaction. Regarding the factor of raw-material composition ratio among these factors, polycondensation is carried out with almost the same raw-material composition ratio in conventional findings. Hence, the present invention follows the conventional findings concerning the factor of raw-material composition ratio and thus the raw-material composition ratio was employed as a fixed control factor. Moreover, the esterification step and the initial polycondensation step focus on ensuring oligomer synthesis by binding 1,4-butanediol to both terminal carboxyl groups of succinic acid. Therefore, these steps are thought not to significantly affect main chain growth and side chain growth, and thus various relating conditions were employed as fixed conditions. Of these, 230° C. that is the reaction temperature for the esterification step and the initial polycondensation step was selected to limit the reaction temperature to about the boiling point of 1,4-butanediol. Also, in the final polycondensation step, the viscosity of the melting polymer increases and results in a co-rotation phenomenon of fluxional behavior (vaporization area and surface update rate) associated with agitation. Hence, in the final polycondensation step, low-speed agitation is desired to avoid such a co-rotation phenomenon. The final polycondensation step was also carried out with an agitation rate determined to be a fixed factor (Table 3).

TABLE 3

| Fixed factor | Conditions |
|---|---|
| 1,4-butanediol/succinic acid ratio, Temperature · pressure · time for esterification | 1.3, 230° C., 1 atm, 3 h |
| Time · temperature · degree of vacuum for initial polycondensation | 2 h, 230° C., 20 torr |
| Agitation rate for final polycondensation | 1 rpm |

Therefore, other than the final polycondensation reaction time as a signal factor, namely, the temperature, the time, the pressure, and the agitation rate of the intermediate polycondensation reaction and the temperature and the pressure of the final polycondensation reaction were determined to be the remaining 6 control factors.

Finally regarding the error factor, the amount of a melting polymer to be applied into a polymerization unit is selected in view of the fact that the holdup (minimum holdup) of the melting polymer within the continuous polymerization unit cannot be artificially controlled at a fixed level (Table 4).

TABLE 4

| Error factor (uncontrollable) | Level 1 | Level 2 |
|---|---|---|
| Holdup ratio (—) | 1 | 1.5 |

This is because, in continuous polymerization, a successive increase in the degree of polymer polymerization and a subsequent increase in viscosity automatically increase the amount of polymers retained by blades in association with agitation. In the present invention, even in the case of low viscosity, the minimum holdup can be retained generally at at least 100% (the height of the agitation shaft) because of a gate provided within a polymerization unit. Hence, with 100% as a baseline, the value for each level was selected on the assumption that the holdup would be increased.

In the present invention, first, a test was conducted according to Taguchi methods under these conditions. In each test case, time course changes in weight-average molecular weight of a polymer in the final polycondensation step were found. Based on the results, data analysis was conducted. Techniques for data analysis are as follows.

According to Taguchi methods, the results of each parameter experiment are converted to S/N ratio and sensitivity, a correlation was found between them and the value of each parameter and then optimal conditions were selected. A specific calculation method concerning S/N ratio and sensitivity is as described below. First, an experiment of error factor level $J_{MAX}(=2) \times$ signal factor level $K_{MAX}$ was conducted for each of a total of 18 combinations of control factor levels. With the use of the results, the S/N ratio $\eta_{ij}$ ($1 \leq i \leq 8$, $1 \leq j \leq 3$) of each control factor level was approximated as follows. In the present invention, from the output Y (I, J, K) obtained under the conditions of error factor $N_J(1 \leq J \leq J_{MAX})$ and signal factor $M_K(1 \leq K \leq K_{MAX})$ with respect to the $I^{th}$ combination among the 18 combinations, S/N value $\eta_I$ for combination I was found as follows.

$$S_\beta = \{\Sigma_K \Sigma_J M_K \cdot Y(I,J,K)\}^2 / \Sigma_K J_{MAX} \cdot M_K^2 \quad (10)$$

$$S_T = \Sigma_K \Sigma_J Y(I,J,K)^2 \quad (11)$$

$$V_e = (S_T - S_\beta)/(J_{MAX} \cdot K_{MAX} - 1) \quad (12)$$

$$\eta_I = 10 \cdot \log_{10}\{(S_\beta - V_e)/(V_e \Sigma_K J_{MAX} \cdot M_K^2)\} \quad (13)$$

Next, $\eta_{ij}$ was found from $\eta_I$. The level of control factor i in the case of combination I was supposed to be $q_{Ii}$, $\eta_{ij}$ can be evaluated with the following equations.

$$\eta_{ij} = \Sigma_I \eta_I \delta(j = q_{Ii})/9 \quad (I=1) \quad (14)$$

$$\eta_{ij} = \Sigma_I \eta_I \delta(j = q_{Ii})/6 \quad (I \geq 2) \quad (15)$$

From the result, level $j_0(i)$ at which $\eta_{ij}$ was highest in each control factor i was selected.

Next, $i_0$ with the least change in $\eta_{ij}$ and the highest change in sensitivity $s_{ij}$ (when the control factor level was changed)

was selected. Sensitivity $s_{ij}$ can be calculated from the sensitivity $s_I$ of each case I according to Taguchi methods as follows.

$$s_I = 10 \cdot \log_{10}\{(S_\beta - V_e)/\Sigma_K J_{MAX} \cdot M_K^2\} \quad (16)$$

$$s_{ij} = \Sigma_I s_I \delta(j=q_{Ii})/9 (I=1) \quad (17)$$

$$s_{ij} = \Sigma_I s_I \delta(j=q_{Ii})/6 (I \geq 2) \quad (18)$$

From the results of the above calculation, adjustment was carried out so that proportional constant α between signal M and output Y became proper through appropriate selection of the level of control factor $i_0$. In this method, reaction rate constant is desired to be as high as possible (larger-the-better characteristic). Accordingly, sensitivity selected herein was determined to be as high as possible.

As described above, optimal conditions in which S/N ratio and sensitivity have been optimized can be obtained.

Table 5 shows the time dependency of weight-average molecular weight in the final polycondensation step in each experiment case.

TABLE 5

| Error factor Signal factor | Holdup ratio = 1 Time (h) | | | Holdup ratio = 1.5 Time (h) | | |
|---|---|---|---|---|---|---|
| Case | 0 | 1 | 2 | 0 | 1 | 2 |
| 1 | 7500 | 11300 | 14100 | 10900 | 14000 | 16900 |
| 2 | 14700 | 19500 | 24500 | 15700 | 22200 | 27000 |
| 3 | 17800 | 26200 | 32100 | 21200 | 35900 | 41400 |
| 4 | 11600 | 22200 | 35000 | 11800 | 22400 | 35550 |
| 5 | 14800 | 19200 | 24400 | 16900 | 23500 | 29400 |
| 6 | 27700 | 38500 | 43500 | 25800 | 35500 | 40500 |
| 7 | 13900 | 19500 | 25200 | 14400 | 21300 | 29000 |
| 8 | 19000 | 32500 | 45400 | 21000 | 33300 | 41300 |
| 9 | 15800 | 22700 | 28800 | 15900 | 22400 | 28800 |
| 10 | 28300 | 35000 | 38600 | 21200 | 30000 | 32700 |
| 11 | 14200 | 30400 | 37300 | 13200 | 22400 | 35400 |
| 12 | 26600 | 38100 | 41800 | 25600 | 34300 | 37200 |
| 13 | 22900 | 35800 | 43000 | 21000 | 32400 | 39000 |
| 14 | 34900 | 37100 | 39500 | 28300 | 31100 | 33400 |
| 15 | 23900 | 33300 | 37600 | 22200 | 26200 | 32200 |
| 16 | 29700 | 39900 | 44500 | 26200 | 29900 | 32800 |
| 17 | 23000 | 32600 | 37900 | 19400 | 26900 | 32200 |
| 18 | 35000 | 48200 | 55600 | 31400 | 38300 | 44800 |

FIG. 1 shows factor effect graphs concerning S/N ratio and sensitivity obtained by data analysis conducted based on the results according to Taguchi methods. In the present invention, optimal conditions were selected because of the following reasons.

The intermediate polycondensation step with pressure ranging from 4 torr to 6 torr, which is the same or higher than that in the final polycondensation step, is required. Desirably, an appropriate agitation rate ranges from 2 rpm to 4 rpm and short time period ranges from 0.25 hours to 0.75 hours, with the object of reducing the effects associated with a difference in minimum holdup ratio (fluid volume applied).

Desirably, final polycondensation is carried out at high temperatures (245° C. to 255° C.) with the object of accelerating the reaction.

Desirably, an excessive amount of a catalyst is not added with the object of reducing the effects associated with a difference in minimum holdup ratio (fluid volume applied) (1000 ppm to 3000 ppm with respect to succinic acid or a derivative thereof).

The concentration of a modifier has less effects on both S/N ratio and sensitivity than other control factors within the range of the experimental conditions. Hence, the concentration resulting in the highest sensitivity is desired (0.10 mol % with respect to succinic acid or a derivative thereof).

The other control factors can be freely selected. The thus obtained optimal conditions are as summarized in Table 6.

TABLE 6

| | Control factor | Optimal conditions |
|---|---|---|
| A | Amount of catalyst added (ppm) | 1000-3000 |
| B | Concentration of modifier (mol %: with respect to succinic acid or a derivative thereof) | 0.075-0.125 |
| C | Temperature in intermediate polycondensation (° C.) | 235-245 |
| D | Time for intermediate polycondensation (h) | 0.25-0.75 |
| E | Degree of vacuum in intermediate polycondensation (° C.) | 3.0-5.0 |
| F | Agitation rate for intermediate polycondensation (rpm) | 2-5 |
| G | Temperature in final polycondensation (° C.) | 245-255 |
| H | Degree of vacuum in final polycondensation (torr) | 0.5-1.5 |

Hence, the device and the method for producing polybutylene succinate were discovered using the thus obtained optimal conditions.

In addition, the reasons of the selection of the above conditions and the action mechanism are considered as follows. It was revealed that in the intermediate polycondensation step, reaction time and degree of vacuum have some importance, but temperature can be freely selected. Accordingly, the side chains of polymer molecules that are generated in association with addition of a modifier are expected to grow by intermediate polycondensation with relatively low degree of vacuum, and induce reaction inhibition via cyclization reaction when they grow excessively as the polymerization time increases, so as to disturb the growth of the polymer main chain. Poor degree of vacuum is synonymous with difficult devolatilization of 1,4-butanediol as a by-product. Hence, the higher the level of 1,4-butanediol, the easier the side chain growth. Specifically, side chains may mainly grow not by a transesterification reaction, but by an esterification reaction. It was also revealed that similarly high-temperature polymerization is desired for final polycondensation. This is thought to suggest that the activation energy of the main polymerization reaction; that is, a main chain growth reaction (transesterification reaction), is higher than that of a side chain growth reaction. It was also revealed that the amount of a catalyst added is important.

The present invention will be explained more specifically with reference to drawings, but the scope of the present invention is not limited thereto.

Figure 2:
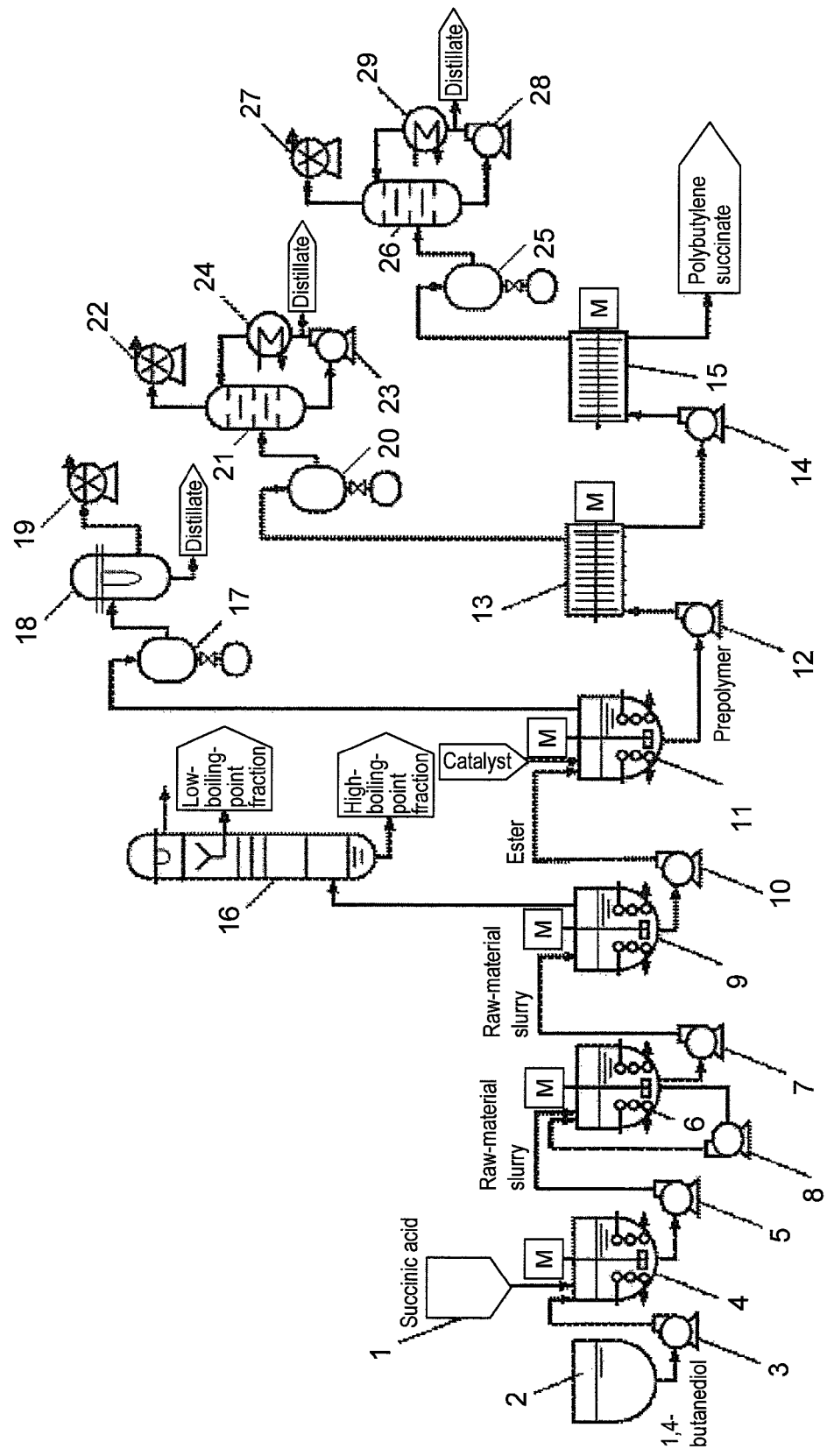
FIG. 2 shows an example of the device for producing polybutylene succinate according to the present invention.

FIG. 2 shows an example of the device for producing polybutylene succinate according to the present invention. For the sake of convenience, a case in which polybutylene succinate is produced using the device is explained herein. The method for producing polybutylene succinate according to the present invention can be performed using the device shown in FIG. 2. However, the examples are not limited thereto and polybutylene succinate can also be produced using other apparatuses without departing from the intent of the present invention.

The device according to the present invention comprises a raw-material slurry preparation tank 4, a raw-material slurry storage tank 6, an esterification reactor 9, an initial polycondensation reactor 11, an intermediate polycondensation reactor 13, and a final polycondensation reactor 15. In general, the device according to the present invention further comprises a succinic acid supplying apparatus 1, a 1,4-butanediol supplying apparatus 2, and a solution sending apparatus, for example.

In the raw-material slurry preparation tank 4, a raw-material slurry is prepared by mixing succinic acid or a derivative thereof with 1,4-butanediol. As shown in FIG. 2, succinic acid or a derivative thereof is supplied from the succinic acid supplying apparatus 1 and 1,4-butanediol is supplied from the 1,4-butanediol supplying apparatus 2.

Examples of succinic acid or a derivative thereof include succinic acid, succinate esters such as, dimethyl succinate, and diethyl succinate, and succinic anhydride. Of these examples, succinic acid, dimethyl succinate and succinic anhydride are preferred. Succinic acid or a derivative thereof can be used independently or 2 or more types thereof can be used in combination. In the present invention, a glycol component other than 1,4-butanediol may be supplied in a small amount to the raw-material slurry preparation tank. Moreover, a dicarboxylic acid component other than succinic acid or a derivative thereof may be supplied as a modifier in a small amount to the raw-material slurry preparation tank.

Examples of the above glycol component other than 1,4-butanediol include aliphatic glycols having linear or branched alkylene groups, such as ethylene glycol, 1,2-propanediol, 1,3-propanediol, 1,2-butanediol, 1,3-butanediol, 2,3-butanediol, 1,5-pentanediol, 1,2-pentanediol, 2,4-pentanediol, 1,6-hexanediol, 1,2-hexanediol, neopentylglycol, and 2,2-diethyl-1,3-propanediol, epoxides corresponding 1,2-glycol of these, alcohols with 3 or more valences such as trimethylolpropane, and diepoxides. The amount of the above glycol component(s) (other than 1,4-butanediol) supplied generally ranges from about 0 mol % to 20 mol % (e.g., 0.1 mol % to 20 mol %) and preferably ranges from about 0 mol % to 5 mol % (e.g., 0.2 mol % to 5 mol %) in the whole glycol components.

Examples of a dicarboxylic acid component other than succinic acid or a derivative thereof include: dicarboxylic acid having linear or branched alkylene group such as adipic acid, suberic acid, sebacic acid, azelaic acid, decanedicarboxylic acid, dodecanedicarboxylic acid, octadecanedicarboxylic acid, dimer acid; the dicarboxylate esters such as dimethyl adipate and dimethyl malonate; acid anhydrides such as maleic anhydride, itaconic acid anhydride, and adipic anhydride; and oxycarboxylic acids such as malic acid, tartaric acid, and citric acid. The amount of the above dicarboxylic acid component (other than succinic acid or a derivative thereof) supplied generally ranges from about 0.075 mol % to 0.125 mol % and is preferably about 0.1 mol % with respect to the amount of succinic acid.

The amount of 1,4-butanediol to be supplied differs depending on the physical properties of desired polybutylene succinate, and generally ranges from about 1.02 mol to 1.5 mol and preferably ranges from about 1.03 mol to 1.2 mol with respect to 1 mol of succinic acid or a derivative thereof. The raw-material slurry preparation tank 4 may be heated to secure the flowability of the raw-material slurry. The heating temperature generally ranges from 25° C. to 150° C. and preferably ranges from 50° C. to 100° C.

The raw-material slurry storage tank 6 stores the raw-material slurry supplied from the raw-material slurry preparation tank 4 while maintaining flowability and then supplies the slurry to the esterification reactor 9. The raw-material slurry storage tank 6 may be heated to ensure the flowability of the raw-material slurry. The heating temperature generally ranges from 25° C. to 150° C. and preferably ranges from 50° C. to 100° C. In the raw-material slurry storage tank 6, the raw-material slurry may be circulated at a flow rate that is the same or higher than the sedimentation rate of succinic acid or a derivative thereof using a solution sending apparatus 8 mounted to a circulation line independent from a line for sending the ester to an esterification reactor, in order to prevent the sedimentation of succinic acid or a derivative thereof contained in the raw-material slurry.

As a solution sending apparatus, an apparatus that is generally used in the art can be used. Examples of such an apparatus include a gear pump and a plunger pump. The same applies to the other solution sending apparatuses.

In the esterification reactor 9, the raw-material slurry supplied from the raw-material slurry storage tank 6 is subjected to an esterification reaction at a predetermined temperature and pressure, so as to generate the ester of succinic acid or a derivative thereof and 1,4-butanediol. The reaction temperature in the esterification reactor 9 generally ranges from about 140° C. to 250° C., and preferably ranges from about 145° C. to 245° C. With the reaction temperature of 140° C. or higher, an appropriate rate of reaction can be secured. Also, with the reaction temperature of 250° C. or lower, pyrolysis of the thus generated ester can be prevented. An esterification reaction is generally performed at an ordinary pressure. The esterification reaction is performed until the acid value of the ester reaches 30 or less, preferably 15 or less, and further preferably 10 or less. As a heating method for the reactor, a method that is generally employed in the art can be used. Examples thereof include a method that involves providing a heating medium jacket at the peripheral part of the reactor, and thus allowing the reaction solution to be heated by heat transfer through the reactor wall surface, and a method that involves heating via heat transfer through a heat transfer tube (coil) within the reactor. These methods may be employed independently or in combination.

As the esterification reactor 9, a reactor that is generally used when polyester is produced by esterification can be used. An example of such a reactor is a vertical agitation tank provided with agitation blades (e.g., paddle blades or helical ribbon blades) having a vertical rotary shaft. A distillate discharged from the esterification reactor 9 is caused to flow into a distillation column 16 provided on the upper part of the esterification reactor 9. 1,4-butanediol contained in a high-boiling-point fraction may be collected, refluxed to the raw-material slurry preparation tank 4 or the like, and thus reused.

In the present invention, the polycondensation reactor is divided into, from the upstream side, at least an initial polycondensation reactor, an intermediate polycondensation reactor, and a final polycondensation reactor and used. The polycondensation reactor may further comprise another reactor(s).

In the initial polycondensation reactor 11, the ester supplied from the esterification reactor 9 is subjected to a polycondensation reaction at a predetermined temperature and pressure, so as to generate prepolymers having hydroxyl groups at their ends. The reaction temperature in the initial polycondensation reactor generally ranges from about 140° C. to 250° C. and preferably ranges from about 145° C. to 245° C. With a reaction temperature of 140° C. or higher, an appropriate rate of reaction can be secured. Furthermore, with a reaction temperature of 250° C. or lower, pyrolysis of the thus generated prepolymers can be prevented. The reaction is generally performed at a low pressure (e.g., about 5 torr to 200 torr).

A polycondensation reaction is performed in the presence of a catalyst(s). Catalysts can be used independently or two or more types of catalyst can be used in combination. As catalysts, a broad range of catalysts (to be used for transesterification reactions) can be used. Examples thereof include metal compounds containing metal such as Li, Mg, Ca, Ba, La, Ce, Ti, Zr, Hf, V, Mn, Fe, Co, Ir, Ni, Zn, Ge, and Sn. Specific examples thereof include organic acid salts and organic metal compounds such as metal alkoxide, and a metal complex (e.g., acetylacetonato), as well as inorganic metal compounds such as metal oxide, metal hydroxide, carbonate, phosphate, sulfate, nitrate, and chloride. Among these metal compound catalysts, titanium compounds, particularly, organic titanium compounds such as titanium alkoxide (e.g., titanium tetraethoxide, titanium tetraisopropoxide, and titanium tetrabutoxide) are preferred. Furthermore, as catalysts, catalysts comprising metals or metal compounds selected from the group consisting of group IA, group IIIA, group IV, group IIB, and group VA of the periodic table can be used. Of these, a tin-based compound such as tin octylate or an antimony-based compound such as antimonous oxide may be preferably used. The amount of a catalyst(s) to be added ranges from 1000 ppm to 3000 ppm, and preferably ranges from 1500 ppm to 2500 ppm with respect to that of succinic acid or a derivative thereof. A catalyst is added through the use of a catalyst addition apparatus and is preferably added to the initial polycondensation reactor.

The initial polycondensation reactor generally comprises a heating apparatus for setting the reaction temperature to the above temperature. As a heating method for the reactor, a method that is generally employed in the art can be used. Examples thereof include a method that involves providing a heating medium jacket at the peripheral part of the reactor, thus allowing the reaction solution to be heated by heat transfer through the reactor wall surface, and a method that involves heating via heat transfer through a heat transfer tube (coil) within the reactor. These methods may be employed independently or in combination.

As the initial polycondensation reactor, a reactor that is generally employed upon production of polyester by transesterification can be used. The initial polycondensation reactor has at least a reactor, an ester supply port, and a prepolymer discharge port. In general, the initial polycondensation reactor also comprises a thermometer. Examples of the reactor are not particularly limited and an example thereof is a vertical agitation tank provided with agitation blades (e.g., paddle blades and helical ribbon blades) having a vertical rotary shaft. A distillate that is discharged from the initial polycondensation reactor 11 is cooled and concentrated by a heat exchanger 18, and then caused to flow into a distillation column 17 provided on the upper part of the initial polycondensation reactor 11. 1,4-butanediol contained in the resulting high-boiling-point fraction may be collected, refluxed to the raw-material slurry preparation tank 4 and the like, and thus reused.

In the intermediate polycondensation reactor 13, prepolymer supplied from the initial polycondensation reactor 11 is subjected to a polycondensation reaction at a predetermined temperature and pressure, so as to generate polybutylene succinate. The reaction temperature in the intermediate polycondensation reactor generally ranges from 235° C. to 245° C., and is preferably 240° C. With the reaction temperature of 235° C. or higher, an appropriate rate of reaction can be secured. Also, with the reaction temperature of 245° C. or lower, pyrolysis of polybutylene succinate can be prevented. The reaction time ranges from 0.25 hours to 0.75 hours and is preferably 0.5 hours. The reaction time can be determined and adjusted by a solution sending apparatus 12 for supplying prepolymer from the initial polycondensation reactor to the intermediate polycondensation reactor and a solution sending apparatus 14 for supplying polybutylene succinate from the intermediate polycondensation reactor to the final polycondensation reactor. Pressure generally ranges from 3 torr to 5 torr and is preferably 4 torr.

The intermediate polycondensation reactor has at least a reactor, a prepolymer supply port, and a polybutylene succinate discharge port. The reactor generally also comprises a thermometer. Examples of the reactor that can be used herein are not particularly limited and include a vertical reactor, a horizontal reactor, and a tank reactor. Two or more reactors may be disposed in series, or only one reactor may be used herein. As agitation blades, lattice blades, wheel blades, spectacle blades, hybrid blades, paddle blades, turbine blades, anchor blades, double-motion blades, helical ribbon blades, and the like can be used. The agitation rate for the intermediate polycondensation reactor generally ranges from 2 rpm to 4 rpm and is preferably 3 rpm.

The intermediate polycondensation reactor generally comprises a heating apparatus for setting the reaction temperature to the above temperature. As a heating method for the reactor, a method that is generally employed in the art can be used. Examples thereof include a method that involves providing a heating medium jacket at the peripheral part of the reactor, thus allowing the reaction solution to be heated by heat transfer via the reactor wall surface, and a method that involves heating by heat transfer through a heat transfer tube (coil) within the reactor. These methods may be employed independently or in combination. A distillate that is discharged from an intermediate polycondensation reactor 13 is cooled and concentrated by a wet condenser 21, and then caused to flow into a distillation column 20 provided on the upper part of the intermediate polycondensation reactor 13. 1,4-butanediol contained in the resulting high-boiling-point fraction may be collected, refluxed to the raw-material slurry preparation tank 4 or the like, and thus reused.

In the final polycondensation reactor 15, polybutylene succinate supplied from the intermediate polycondensation reactor 13 is subjected to a polycondensation reaction at a predetermined temperature and pressure, so as to increase the molecular weight of polybutylene succinate. The reaction temperature in the final polycondensation reactor ranges from 245° C. to 255° C. and is preferably about 250° C. Also, the reaction temperature in the final polycondensation reactor is preferably higher than that in the intermediate polycondensation reactor by 5° C. to 15° C. With the temperature of lower than 245° C. that is lower than the temperature in the intermediate polycondensation, the rate of reaction is low and the practicality is poor. Moreover, the temperature higher than 255° C. may cause pyrolysis of polybutylene succinate. Pressure generally ranges from 0.5 torr to 1.5 torr and is preferably 1 torr. The final polycondensation reactor has at least a reactor, a polybutylene succinate supply port, and a polybutylene succinate discharge port. The final polycondensation reactor generally further comprises a thermometer. Examples of the reactor that can be used herein are not particularly limited and include a vertical reactor, a horizontal reactor, and a tank reactor. Two or more reactors may be disposed in series or only one reactor may be used herein. As agitation blades, lattice blades, wheel blades, spectacle blades, hybrid blades, paddle blades, turbine blades, anchor blades, double-motion blades, helical ribbon blades, and the like can be used.

The final polycondensation reactor comprises a heating apparatus for setting the reaction temperature to the above temperature. As a heating method for the reactor, a method that is generally employed in the art can be used. Examples thereof include a method that involves providing a heating medium jacket at the peripheral part of the reactor, thus allowing the reaction solution to be heated by heat transfer via the reactor wall surface, and a method that involves heating via heat transfer through a heat transfer tube (coil) within the reactor. These methods may be employed independently or in combination. A distillate discharged from the final polycondensation reactor 15 is cooled and concentrated by a wet condenser 26 and then caused to flow into a distillation column 25 provided on the upper part of the final polycondensation reactor 15. 1,4-butanediol contained in a high-boiling-point fraction may be collected, refluxed to the raw-material slurry preparation tank 4 or the like, and thus reused.

EXAMPLES

Example 1

Polybutylene succinate was produced using the device shown in FIG. 2.

In the raw-material slurry preparation tank 4, succinic acid supplied from the succinic acid supplying apparatus 1 and 1,4-butanediol supplied from the 1,4-butanediol supplying apparatus 2 were mixed so as to prepare a raw-material slurry. 1.3 mol of 1,4-butanediol was added to 1 mol of succinic acid. The heating temperature was 80° C. Furthermore, 0.1 mol % malic acid was added as a modifier to succinic acid.

In the raw-material slurry storage tank 6, the raw-material slurry was circulated at a flow rate that was the same or higher than the sedimentation rate of succinic acid using the solution sending apparatus 8. The circulation rate of the raw-material slurry was 0.004 m/s while the sedimentation rate of succinic acid was 0.00015 m/s. The heating temperature was 80° C.

In the esterification reactor 9, the raw-material slurry supplied from the raw-material slurry storage tank 6 was heated at 230° C. for an esterification reaction, so that the ester of succinic acid and 1,4-butanediol was generated.

In the initial polycondensation reactor 11, titanium tetrabutoxide was added as a catalyst with a concentration of 2000 ppm (with respect to succinic acid) to the ester supplied from the esterification reactor 9. Polycondensation was carried out at 230° C. and 20 torr and thus prepolymer was synthesized.

Figure 3:
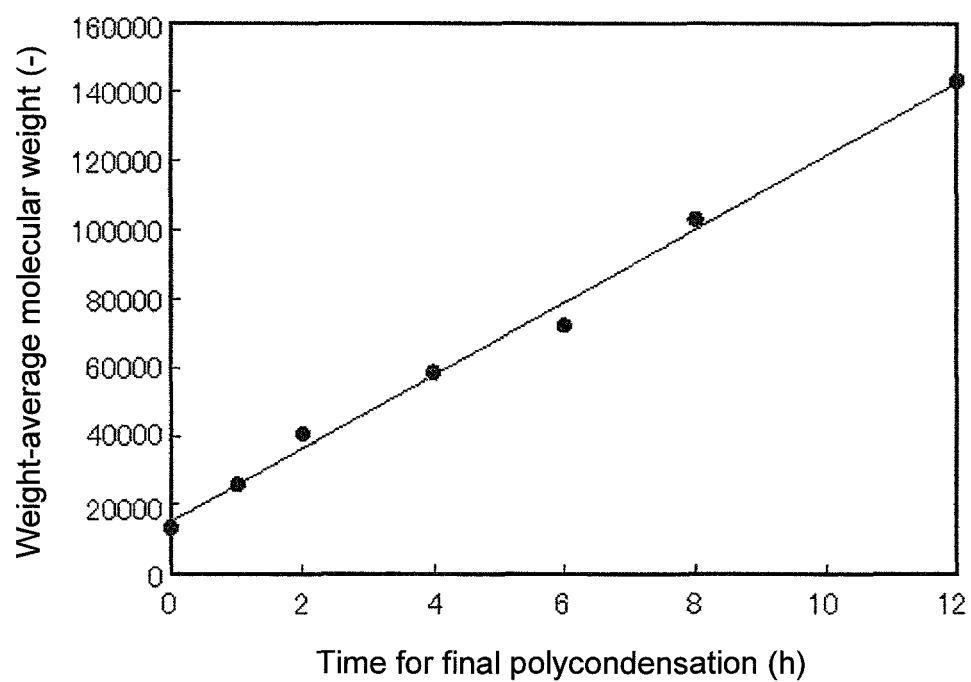
FIG. 3 shows a graph showing the relationship between the weight-average molecular weight of polybutylene succinate obtained in Example 1 and the reaction time in the final polycondensation reactor.

In the intermediate polycondensation reactor 13, the prepolymer supplied from the initial polycondensation reactor 11 was subjected to polycondensation under conditions of the agitation rate of 3 rpm, 240° C., 4 torr, and 0.5 hours. In the final polycondensation reactor 15, polybutylene succinate supplied from the intermediate polycondensation reactor 13 was subjected to polycondensation under conditions of the agitation rate of 1 rpm, 250° C., and 1 torr. Thus, polybutylene succinate was synthesized. The weight-average molecular weight of the polybutylene succinate synthesized by 12 hours of reaction in the final polycondensation reactor was 140000 (FIG. 3).

Comparative Example 1

Figure 4:
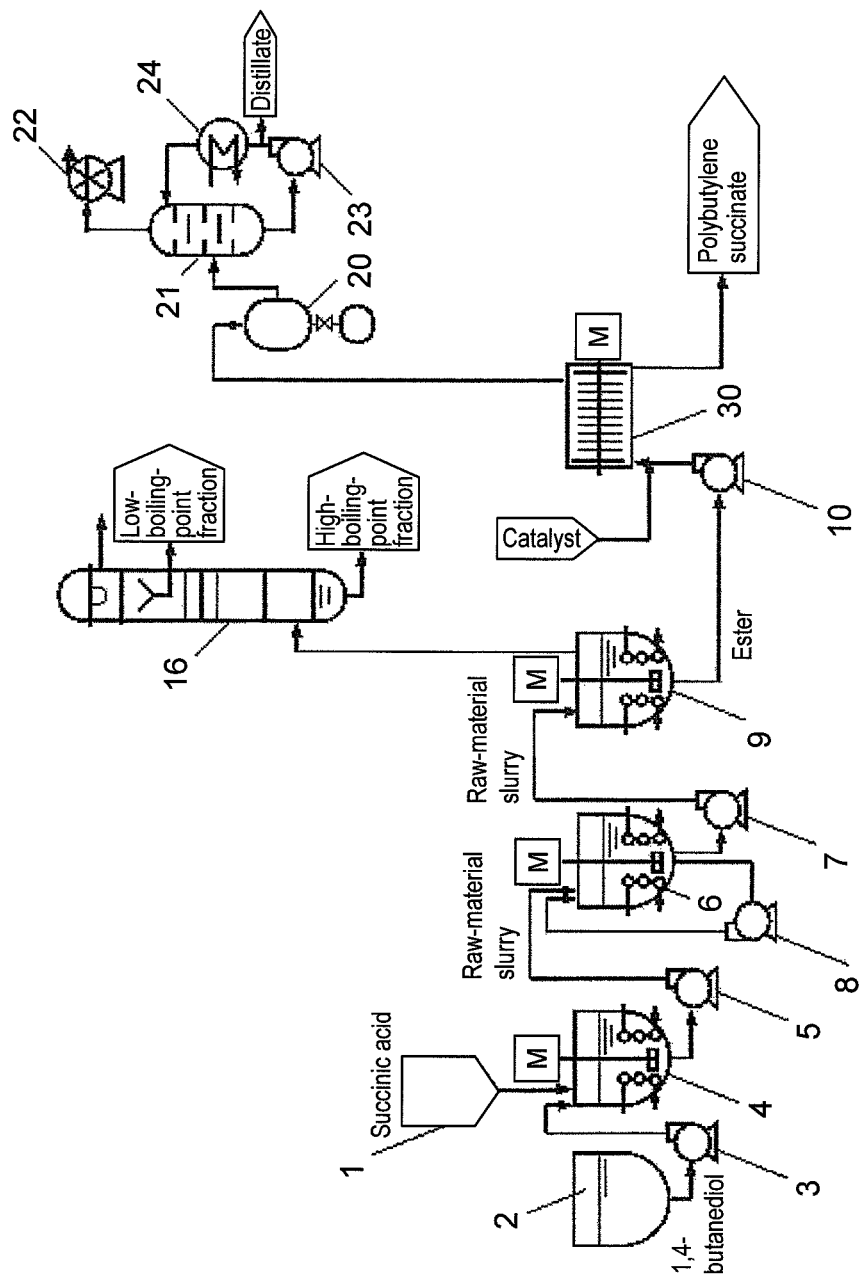
FIG. 4 shows the device for producing polybutylene succinate, which was used in Comparative Examples, whereby prepolymer synthesis and polycondensation were performed with a can of reactor.

With the use of a device shown in FIG. 4 for carrying out prepolymer synthesis and polycondensation with a can of reactor, polybutylene succinate was produced with a process similar to that in Example 1. The temperature, degree of vacuum, and agitation rate for the polycondensation reactor 30 were 240° C., 2 torr, and 3 rpm, respectively. The weight-average molecular weight of polybutylene succinate synthesized by 16.5 hours of reaction in the polycondensation reactor 30 was 70000.

Comparative Example 2

With the use of a device shown in FIG. 2, polybutylene succinate was produced with a process similar to that in Example 1 with the proviso that the reaction time in the intermediate polycondensation reactor was 3 hours and the degree of vacuum for the same was 2 torr. The reaction temperature in the final polycondensation reactor was 240° C. The weight-average molecular weight of polybutylene succinate synthesized by 12 hours of reaction in the final polycondensation reactor was 90000.

Comparative Example 3

With the use of the device shown in FIG. 2, polybutylene succinate was produced with a process similar to that in Example 1 with the proviso that the amount of a catalyst added was 500 ppm with respect to succinic acid. The weight-average molecular weight of polybutylene succinate synthesized by 12 hours of reaction in the final polycondensation reactor was 70000.

Comparative Example 4

With the use of the device shown in FIG. 2, polybutylene succinate was produced with a process similar to that in Example 1 with the proviso that the reaction time for the intermediate polycondensation reactor was 0.2 hours. The weight-average molecular weight of polybutylene succinate synthesized by 12 hours of reaction in the final polycondensation reactor was 80000.

Comparative Example 5

With the use of the device shown in FIG. 2, polybutylene succinate was produced with a process similar to that in Example 1 with the proviso that the reaction temperature in the final polycondensation reactor was 260° C. The weight-average molecular weight of polybutylene succinate synthesized by 12 hours of reaction in the final polycondensation reactor was 80000.

All publications, patents, and patent applications cited herein are incorporated herein by reference in their entirety.

EXPLANATION OF REFERENCE NUMERALS

1: Succinic acid supplying apparatus
2: 1,4-butanediol supplying apparatus
4: Raw-material slurry preparation tank
6: Raw-material slurry storage tank
3, 5, 7, 8, 10, 12, 14, 23, 28: Solution sending apparatus
9: Esterification reactor
11: Initial polycondensation reactor
13: Intermediate polycondensation reactor
15: Final polycondensation reactor
16, 17, 20, 25: Distillation column
18: Heat exchanger
21: Wet condenser
19, 22, 27: Ventilation apparatus
24, 29: Heat exchanger
26: Wet condenser
30: Polycondensation reactor

The invention claimed is:
1. A method for producing polybutylene succinate, comprising the steps of:
preparing a raw-material slurry by mixing succinic acid or a derivative thereof with 1,4-butanediol in a raw-material slurry preparation tank;
storing the raw-material slurry in a raw-material slurry storage tank while maintaining flowability;

carrying out an esterification reaction of the raw-material slurry in an esterification reactor; and synthesizing polybutylene succinate through a polycondensation reaction of the ester in a polycondensation reactor; wherein the polycondensation reactor is divided into, from the upstream side, at least an initial polycondensation reactor, an intermediate polycondensation reactor, and a final polycondensation reactor;

a catalyst is added in an amount from 1000 ppm to 3000 ppm in relation to succinic acid or a derivative thereof;

the reaction time in the intermediate polycondensation reactor ranges from 0.25 hours to 0.75 hours; and the reaction temperature in the final polycondensation reactor ranges from 245° C. to 255° C.

2. The method for producing polybutylene succinate according to claim 1, wherein the reaction time in the intermediate polycondensation reactor ranges from 235° C. to 245° C.

3. The method for producing polybutylene succinate according to claim 2, wherein the reaction temperature in the final polycondensation reactor is higher than the reaction temperature in the intermediate polycondensation reactor by 5° C. to 15° C.

4. A device for producing polybutylene succinate, comprising:

a raw-material slurry preparation tank for preparing a raw-material slurry by mixing succinic acid or a derivative thereof with 1,4-butanediol;

a raw-material slurry storage tank for storing the prepared raw-material slurry while maintaining flowability;

an esterification reactor for an esterification reaction of the raw-material slurry; and a polycondensation reactor for synthesizing polybutylene succinate through a polycondensation reaction of the ester; wherein the polycondensation reactor is divided into, from the upstream side, at least an initial polycondensation reactor, an intermediate polycondensation reactor, and a final polycondensation reactor;

the device has a catalyst adding apparatus for adding a catalyst in an amount from 1000 ppm to 3000 ppm in relation to succinic acid or a derivative thereof;

the reaction time in the intermediate polycondensation reactor is set from 0.25 hours to 0.75 hours, and the reaction temperature in the final polycondensation reactor is set from 245° C. to 255° C.

5. The device for producing polybutylene succinate according to claim 4, wherein the reaction temperature in the intermediate polycondensation reactor is set from 235° C. to 245° C.

6. The device for producing polybutylene succinate according to claim 5, wherein the reaction temperature in the final polycondensation reactor is set to be higher than the reaction temperature in the intermediate polycondensation reactor by 5° C. to 15° C.

7. The device for producing polybutylene succinate according to claim 4, wherein the reaction temperature in the final polycondensation reactor is set to be higher than the reaction temperature in the intermediate polycondensation reactor by 5° C. to 15° C.

8. The method for producing polybutylene succinate according to claim 1, wherein the reaction temperature in the final polycondensation reactor is higher than the reaction temperature in the intermediate polycondensation reactor by 5° C. to 15° C.

* * * * *